No. 769,773. PATENTED SEPT. 13, 1904.
W. C. SOUTH.
COLOR PHOTOGRAPHY.
APPLICATION FILED JULY 16, 1902.
NO MODEL.
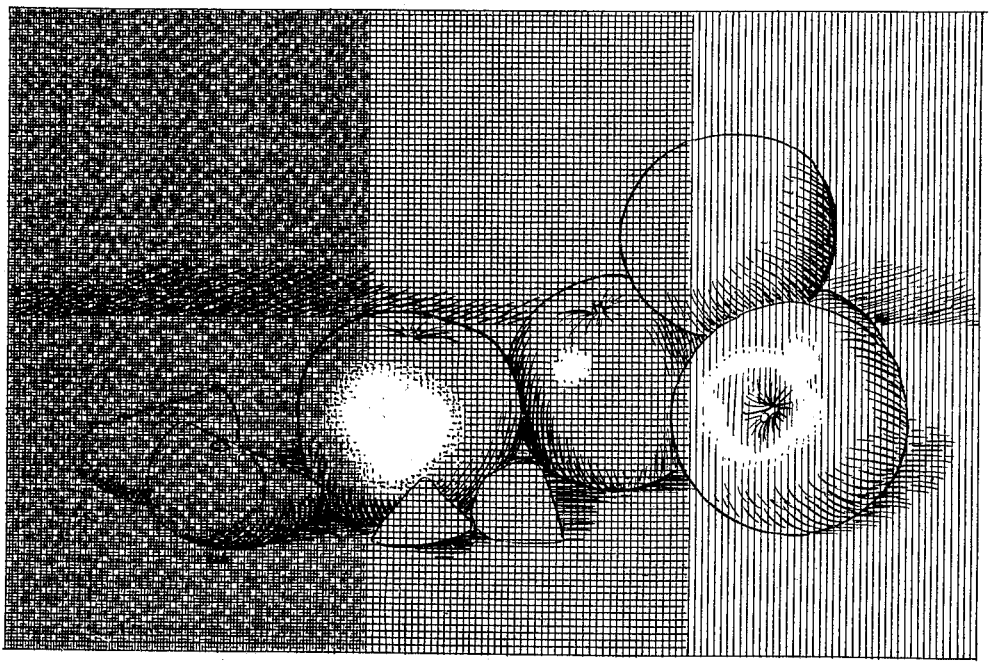

No. 769,773. Patented September 13, 1904.

UNITED STATES PATENT OFFICE.

WILLIAM C. SOUTH, OF BERWYN, PENNSYLVANIA.

COLOR PHOTOGRAPHY.

SPECIFICATION forming part of Letters Patent No. 769,773, dated September 13, 1904.

Application filed July 16, 1902. Serial No. 115,752. (No specimens.)

*To all whom it may concern:*

Be it known that I, WILLIAM C. SOUTH, a citizen of the United States, and a resident of Berwyn, in the county of Chester and State of Pennsylvania, have invented new and useful Improvements in Color Photography, of which the following is a specification.

This invention relates to an improved process of obtaining photographic prints in natural colors by means of negatives made with the commercial plates and filters used in the usual three-color photography.

In the accompanying drawing, diagrammatically representing the order of practicing color photography as contemplated by my invention, Print No. 1 represents a section of the first photograph produced by printing in red, Print No. 2 represents a section of the second photograph produced by printing in blue upon the red, and Print No. 3 represents a section of a third or final photograph produced by printing in yellow on the blue.

In the practice of my process a suitable paper, as Whatman's for artistic effects or Baryta for commercial use, is coated with an emulsion consisting of water and glue, in equal parts, saturated with an alkali bichromate, as potassium or ammonium bichromate, to which is added the dye or pigment required for producing the red print, and the coated paper is thoroughly dried. The red is printed upon this coated and dried paper until the image can be seen faintly by means of the proper negative, which, like the negatives for the blue and yellow prints, may be made on ortho or iso chromatic plates through the proper filters. All traces of the emulsion not acted upon by the light are washed away with hot water, and the print is thoroughly dried.

The red print is coated with any suitable blue-print solution containing an addition of glue, preferably a ferric solution, such as produced by combining a solution consisting of, say, two ounces of ammonium ferric citrate in eight ounces of water with a solution consisting of, say, one and one-fourth ounces of potassium ferricyanid in eight ounces of water, to which is added a few drops of glue. The blue is then printed quite deeply and the print washed under the tap. If found printed too deeply, it may be reduced by applying thereto hot water or a weak alkaline solution, such as ammonia or soda, or if it requires to be intensified a weak solution of citric acid may be applied to it for this purpose. The print is then dried.

The blue print is coated with an emulsion consisting of water and glue, in equal parts, saturated with an alkali bichromate, as potassium or ammonium bichromate, to which is added the pigment required for producing the yellow print, and the product is dried. The yellow print is then made from the proper negative, printing until the yellow looks fairly well tanned. Then wash in hot water until all of the emulsion is removed that has not been acted upon by the light and dry.

Various kinds of animal glue have been used with satisfactory results; but Lepage's fish-glue has been found most satisfactory in producing clear, clean, and easily-developed pictures, overcoming many of the defects found in the use of the gum-bichromate process. Practically all clear hydroscopic glues have been used with greater or less success. In the present process the addition of glue to the blue-print formula causes the blue to print uniformly, it otherwise failing to adhere with the regularity desirable for the most satisfactory results, particularly where the red is printed quite deeply, as it resists or repels the water.

In the usual practice of three-color photography, in which the primary colors yellow, red, and blue are combined for the purpose of producing photographs in natural colors, the yellow is printed first, then the red, and last the blue. In this procedure satisfactory results are obtained with difficulty, because the deep and strong red may cover up all trace of the delicate yellow image and render it impossible to go further; but if, as by the present process, it is possible to print the red first and upon developing and drying that cover it with a transparent blue-print solution, a light-brown straw color turning blue after printing, it is possible to obtain perfect registry in printing the blue, and upon the strong picture formed by the combination of red and blue, reduced or intensified, as desired, the transparent yellow is printed with rare fidelity and beauty.

Advantages of this process over the usual color photography may be illustrated by comparison with monochrome or black and white. A black-and-white or half-tone picture is composed of white, which represents high light, gray, which represents color or tone, and black, which represents shadow. Upon the amount of black contained in a picture depends its pluck or strength. If we reduce or intensify the shadow or black, we reduce or intensify the effect. The shadows make the picture, a picture containing strong shadows and much contrast being strong, while a gray picture is flat. In comparing color-work with monochrome or black and white the red represents tone or color and corresponds to gray, also representing tone or color. The blue represents shadow and corresponds to black, also representing shadow, and the yellow represents light and corresponds to white, also representing light. The blue of the color-work, making the shadow, determines whether the picture shall be full of contrast or flat and somber, and it is therefore obvious that to be able to strengthen or reduce the shadow portion of the picture at will, as in the present process, presents great advantages over processes in which the half-tone and delicate lights are also affected by reduction or intensification. In printing the blue in the manner described not only may the shadows be heightened or lessened at will, so as to obtain strikingly truthful results, but the blue-print may be wholly obliterated, if desired, as in case of mistake, and printed over again, as well as changed to suit the other colors chosen.

While the blue-print formula requires no change to obtain the desired results, since the effect may be varied at pleasure by the use of the reducer or intensifier, it will be understood that the colors used for staining the bichromate and glue solutions will depend upon the brand of plates selected, the color system being adjusted to suit commercial plates and filters, such as Cramer's iso and Carbutt's poly chromatic plates and the filters adjusted therefor.

While my process has as its leading purpose the production of three-color photographs from negatives of the same object properly exposed, superposed in registry and developed, in the sequence described, it will be understood that it produces one-color and two-color photographs. A photograph is made by the first step involving the operation of printing and developing a bichromatized colloid coating having a dark color, and a pleasing photograph is made by printing and developing a blue image in registry with the dark image.

Having described my invention, I claim—

1. The improvement in color photography which consists in photographically printing in registration two images of the same object, the one image being formed by printing and developing the same upon a pigmented bichromatized colloid coating of suitable character and the other image being formed by printing and developing the same upon a substantially transparent coating which develops blue, substantially as specified.

2. The improvement in color photography which consists in printing in registration two differently-colored images of the same object, the darker image being formed by printing and developing the same upon a surface coated with a dark pigmented bichromatized colloid solution of suitable character, and the lighter image being formed by coating the darker with a substantially transparent solution which develops blue and thereupon printing and developing a blue image, substantially as specified.

3. The improvement in color photography which comprises printing and developing an image corresponding to the dark color of the photograph upon a surface coated with a dark pigmented bichromatized glue, coating the dark image with a substantially transparent solution which develops blue, and printing in registration with the dark image and developing a blue image of the same object thereon, substantially as specified.

4. The improvement in color photography which comprises printing and developing an image corresponding to the red color in the photograph upon a suitably-coated surface, then printing in registration therewith and developing an image of the same object corresponding to the blue color in the photograph upon the surface suitably coated therefor with a substantially transparent solution which develops blue, and then printing in registration therewith and developing an image of the same object corresponding to the yellow color in the photograph upon the surface suitably coated therefor, substantially as specified.

5. The improvement in color photography which comprises photographically printing and developing a red image of a subject upon a surface coated with a red pigmented bichromatized glue, photographically printing in registration therewith and developing a blue image of the same subject upon a substantially transparent coating thereon which develops blue, and photographically printing in registration therewith and developing a yellow image of the same subject upon a coating thereon of yellow pigmented bichromatized glue, substantially as specified.

6. The improvement in color photography which comprises photographically printing and developing a red image upon a surface coated with a red pigmented bichromatized hydroscopic glue, photographically printing in registration therewith and developing a blue image of the same object upon a substantially transparent coating thereon which develops blue, and photographically printing in registration therewith and developing a yellow image of the same object upon a yellow pigmented bichromatized hydroscopic animal-glue coating placed on the double image, substantially as specified.

7. The improvement in color photography which comprises photographically printing and developing a red image upon a surface coated with a red pigmented bichromatized fish-glue, photographically printing in registration therewith and developing a blue image of the same object upon a substantially transparent coating thereon which develops blue, said coating containing fish-glue, and photographically printing in registration therewith and developing a yellow image of the same object upon a yellow pigmented bichromatized fish-glue coating placed on the double image, substantially as specified.

8. The improvement in color photography which comprises printing and developing a colored image on a sensitized surface of suitable character therefor, coating said image with a substantially transparent solution having the property of developing upon exposure a desired second color for combination with said first color and printing in registration with said first image and developing an image of the same object in said second color, substantially as specified.

9. A method of producing photographs in natural colors by coating paper or other suitable support with a sensitive layer for one primary color, exposing and developing, applying directly another sensitive film for the next primary color, exposing and developing and again superposing directly another sensitive layer for the next primary color, exposing and developing as herein set forth and described.

10. A method of producing multicolored photographs by the direct superposition of sensitive films or layers exposing and developing each film or layer before applying the succeeding one, substantially as herein set forth and described.

In testimony whereof I have hereunto set my hand, in the presence of the subscribing witnesses, this 15th day of July, 1902.

W. C. SOUTH.

Witnesses:
   Geo. W. South,
   Francis S. Ginther.